US008973263B2

(12) United States Patent
Rivera

(10) Patent No.: US 8,973,263 B2
(45) Date of Patent: Mar. 10, 2015

(54) COMPOSITE DUCT ASSEMBLY

(75) Inventor: Anthony Rivera, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 876 days.

(21) Appl. No.: 13/094,037

(22) Filed: Apr. 26, 2011

(65) Prior Publication Data

US 2011/0203725 A1    Aug. 25, 2011

Related U.S. Application Data

(62) Division of application No. 11/761,489, filed on Jun. 12, 2007, now Pat. No. 7,963,098.

(51) Int. Cl.
*B21D 53/78* (2006.01)
*F16L 9/22* (2006.01)
*B29C 70/30* (2006.01)
*F16L 9/00* (2006.01)
*F16L 9/16* (2006.01)
*B29K 307/00* (2006.01)
*B29L 23/00* (2006.01)

(52) U.S. Cl.
CPC . *F16L 9/22* (2013.01); *B29C 70/30* (2013.01); *B29K 2307/00* (2013.01); *B29L 2023/00* (2013.01); *F16L 9/006* (2013.01); *F16L 9/16* (2013.01)
USPC .......................................... 29/889; 123/41.7

(58) Field of Classification Search
CPC ........ B29C 70/30; F16L 9/22; F16L 23/0283; F16L 9/006; F16L 9/16; B29K 2307/00; B29L 2023/00; F24F 13/0209
USPC .......... 138/111–113, 156–171; 156/217, 218, 156/247, 60; 285/285.1–196.1, 423, 65; 29/889–889.722; 60/226.1
See application file for complete search history.

(56) References Cited

U.S. PATENT DOCUMENTS

| 3,771,820 | A |   | 11/1973 | Hoss, Sr. et al. |
|-----------|---|---|---------|------------------|
| 4,005,822 | A |   | 2/1977  | Timms |
| 4,062,917 | A | * | 12/1977 | Hill et al. ........................ 264/102 |
| 4,328,981 | A | * | 5/1982  | Greene et al. ............... 285/288.1 |
| 4,425,080 | A |   | 1/1984  | Stanton et al. |
| 4,865,267 | A |   | 9/1989  | Severson |
| 5,083,426 | A |   | 1/1992  | Layland |
| 5,315,820 | A |   | 5/1994  | Arnold |
| 5,431,870 | A |   | 7/1995  | Andre |

(Continued)

FOREIGN PATENT DOCUMENTS

EP        0531840 A1    3/1993

OTHER PUBLICATIONS www.thefreedictionary.com/radial ret. Aug. 14, 2014.*

(Continued)

*Primary Examiner* — Jacob Cigna
(74) *Attorney, Agent, or Firm* — Carlson, Gaskey & Olds

(57) ABSTRACT

A method of manufacturing a carbon composite duct assembly includes providing a first carbon composite fabric layer having a first section. The first section is formed into a first portion and a second portion. The first portion is separately moveable relative to the second portion. The first portion overlaps the second portion to define a first corner of the first carbon composite fabric layer. The first carbon composite fabric layer is formed into at least a portion of a duct extending along an axis.

20 Claims, 6 Drawing Sheets

(56) References Cited

U.S. PATENT DOCUMENTS

| | | |
|---|---|---|
| 5,443,784 A | 8/1995 | Celerier et al. |
| 5,795,383 A | 8/1998 | Okamoto et al. |
| 6,194,662 B1 * | 2/2001 | Smith .......................... 174/66 |
| 6,439,840 B1 | 8/2002 | Tse |
| 6,532,731 B2 | 3/2003 | Springer |
| 6,554,564 B1 | 4/2003 | Lord |
| 6,732,502 B2 | 5/2004 | Seda et al. |
| 6,901,739 B2 | 6/2005 | Christopherson |
| 6,968,674 B2 | 11/2005 | Wollenweber |
| 6,991,124 B1 * | 1/2006 | Palley et al. .................. 220/1.5 |
| 7,055,306 B2 | 6/2006 | Jones et al. |
| 7,119,275 B2 | 10/2006 | Suzuki et al. |
| 7,140,174 B2 | 11/2006 | Johnson |
| 2004/0012198 A1 | 1/2004 | Brotzell et al. |
| 2005/0229558 A1 | 10/2005 | Stelzer et al. |
| 2007/0107832 A1 | 5/2007 | Frantz et al. |
| 2007/0151214 A1 | 7/2007 | Stelzer et al. |
| 2008/0001396 A1 | 1/2008 | Nish et al. |
| 2008/0115454 A1 | 5/2008 | Xie |
| 2008/0217056 A1 | 9/2008 | Howard |

OTHER PUBLICATIONS

Extended European Search Report for Application No. EP 08 25 1426 mail Jul. 29, 2011.

* cited by examiner

COMPOSITE DUCT ASSEMBLY

CROSS REFERENCE TO RELATED APPLICATIONS

This application is a divisional of application Ser. No. 11/761,489, filed Jun. 12, 2007.

This invention was made with government support under Contract No. n00019-02-c-3003, awarded by the Department of the Navy.

BACKGROUND

This disclosure relates to a method of manufacturing a carbon composite duct assembly, such as for a turbine engine.

A turbine engine may have a bypass duct assembly. The bypass duct assembly provides a source of thrust for the engine and generally surrounds the engine core. The assembly comprises several ducts: an intermediate case duct, a split flange duct and a forward augmenter duct. The intermediate case duct is upstream of the split flange duct, which is followed downstream by the forward augmenter duct.

To provide access to the engine core, the split flange duct is made of two halves split generally along the length of the duct. Each half interfaces with the other half through a flange, an axial flange, extending along the length of the duct. In addition, the split flange duct interfaces with the intermediate case duct and the forward augmenter duct through circumferential flanges that surround the opening of the split flange duct on each side. For each half of the split flange duct, the axial flange and the circumferential flange intersect, forming a corner.

Bypass ducts have typically been made of metal. Recently, carbon fiber has become an alternative source of material for the parts of the turbine engine. One problem presented by the use of carbon fiber has been to attempt to create the corner formed by the circumferential flange and the axial flange. For metal ducts, the corner is either welded, forged or machined. With respect to carbon fiber, however, these techniques are not available for forming a corner.

SUMMARY

An exemplary method of manufacturing a carbon composite duct assembly includes providing a first carbon composite fabric layer having a first section. The first section is formed into a first portion and a second portion. The first portion is separately moveable relative to the second portion. The first portion overlaps the second portion to define a first corner of the first carbon composite fabric layer. The first carbon composite fabric layer is formed into at least a portion of a duct extending along an axis.

The various features and advantages of this disclosure will become apparent to those skilled in the art from the following detailed description. The drawings that accompany the detailed description can be briefly described as follows.

DETAILED DESCRIPTION

Figure 1:
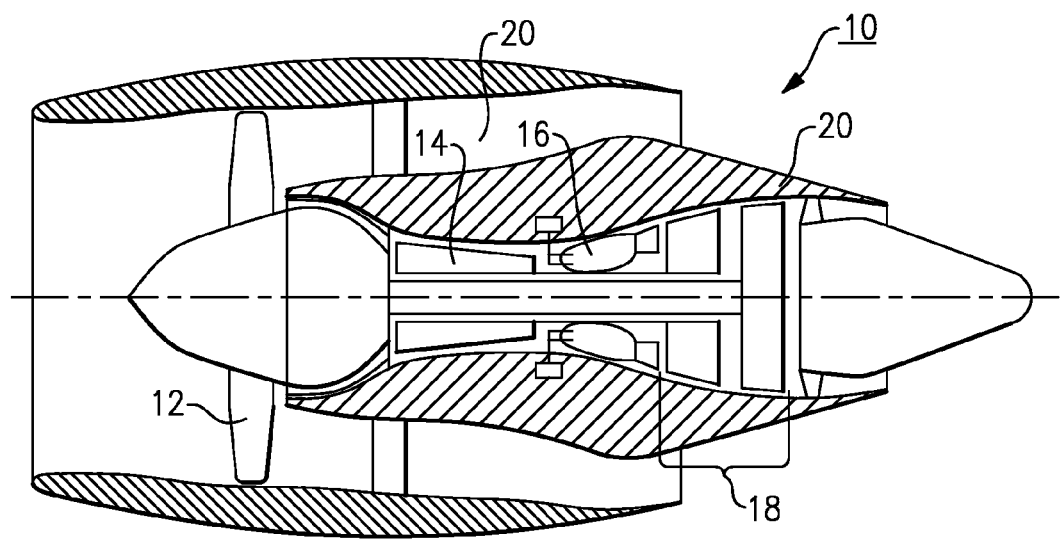
FIG. 1 illustrates a cross-sectional view of a turbine engine.

FIG. 1 illustrates an example of a turbine engine 10, here a turbo fan engine. As other types of turbine engines, such as a turbo jet engine, will likewise benefit from the inventive technique, the term turbine engine is not limited to the disclosed embodiment. As shown, turbine engine 10 has fan 12 through which ambient air is propelled. A multi-stage compressor 14 pressurizes the air and is in communication with the combustor 16 that mixes the compressed air with fuel. The combustor 16 ignites the fuel-air mixture. Expanded gas then passes through the turbine section 18 as shown. Within turbine engine 10 is bypass duct assembly 20. Bypass duct assembly 20 serves to provide additional thrust.

Figure 2:
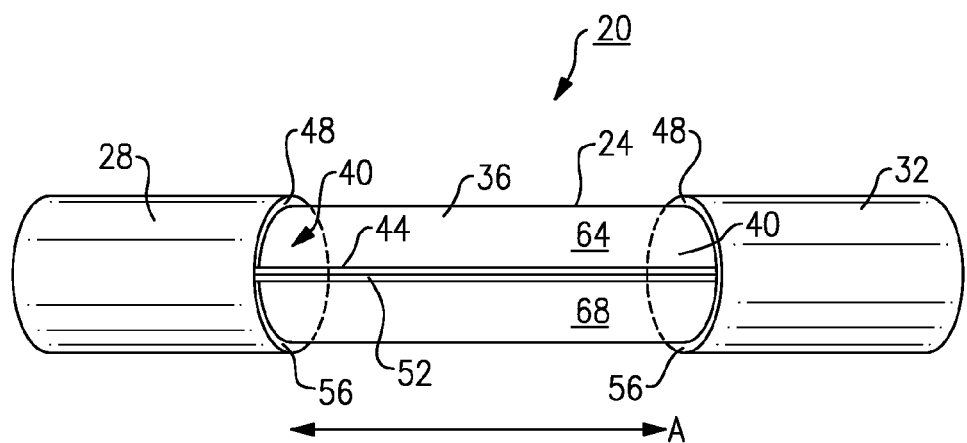
FIG. 2 illustrates a view of a bypass duct assembly for the turbine engine of FIG. 1.

With reference to FIG. 2, a portion of bypass duct assembly 20 has three ducts: intermediate case duct 28, carbon composite duct assembly 24, here a split flange duct, and forward augmenter duct 32. Carbon composite duct assembly 24 extends along axis A. Carbon composite duct assembly 24 has duct body 36 having opening 40 on each end permitting airflow along axis A through duct body 36. Duct body 36 is made of two parts to permit access to the core of turbine engine 10. Duct body 36 has first duct body portion 64 and second duct body portion 68 as shown.

Extending lengthwise or along axis A of first duct body portion 64 is first axial flange 44. Provided around opening 40 is another flange, here first peripheral flange 48, a circumferential flange extending around the circumference of opening 40. Second duct body portion 68 has second axial flange 52 extending along axis A as well as second peripheral flange 56, again a circumferential flange surrounding opening 40. First duct body portion 64 and second duct body portion 68 interface along first axial flange 44 and second axial flange 52. In addition, each half, first duct body portion 64 and second duct body portion 68, also interface in part at first peripheral flange 48 and second peripheral flange 56. First duct body portion 64 and second duct body portion 68 are connected at flanges as known. In addition, carbon composite duct assembly 24 interfaces and connects to intermediate case duct 28 along first peripheral flange 48 and second peripheral flange 56. Forward augmenter 32 interfaces and connects to carbon composite duct assembly 24 through first peripheral flange 48 and second peripheral flange 56 on the other side of carbon composite duct assembly 24.

Figure 3:
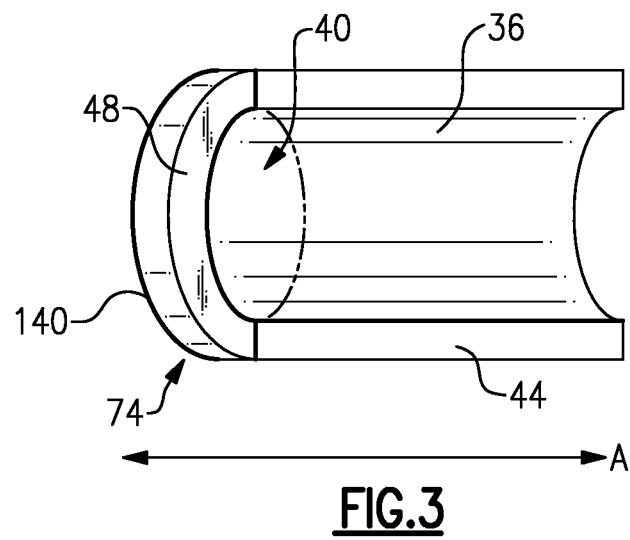
FIG. 3 illustrates a plan view of a portion of the bypass duct assembly of FIG. 2, showing a circumferential flange and an axial flange intersecting to form a corner.
Figure 4:
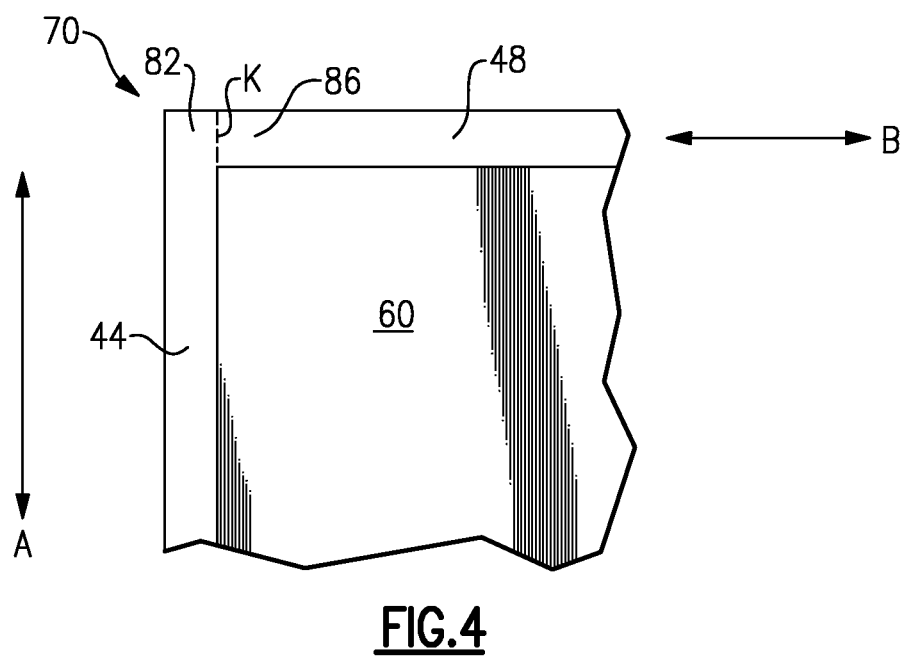
FIG. 4 illustrates a technique for manufacturing the corner of FIG. 3, showing a section of the carbon composite fabric layer.
Figure 5:
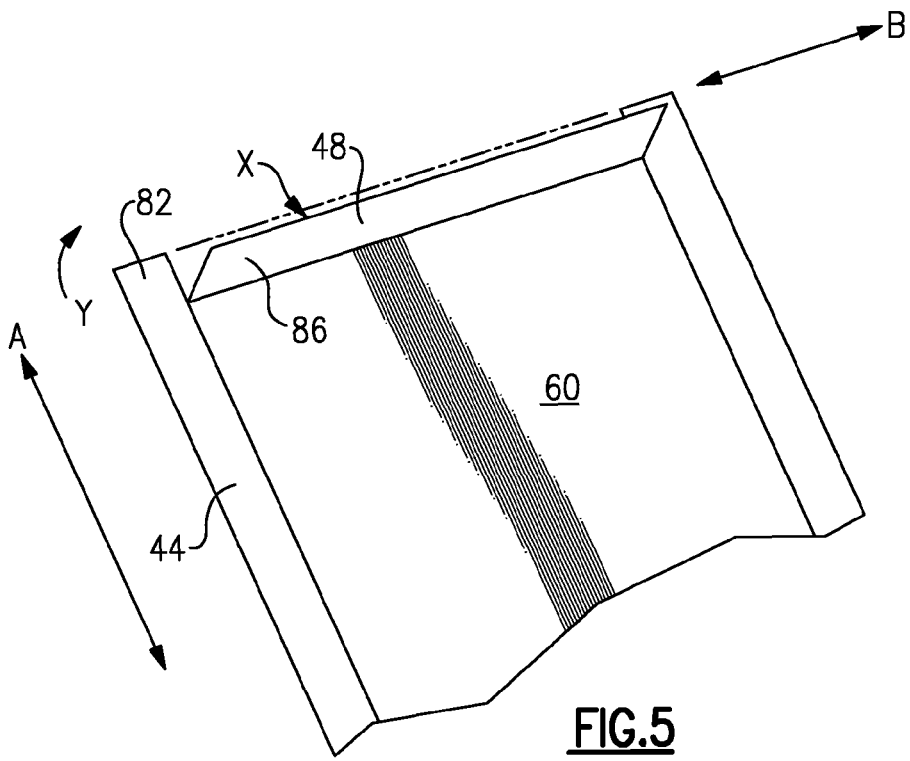
FIG. 5 illustrates the forming of separate portions of the section of FIG. 4.
Figure 6:
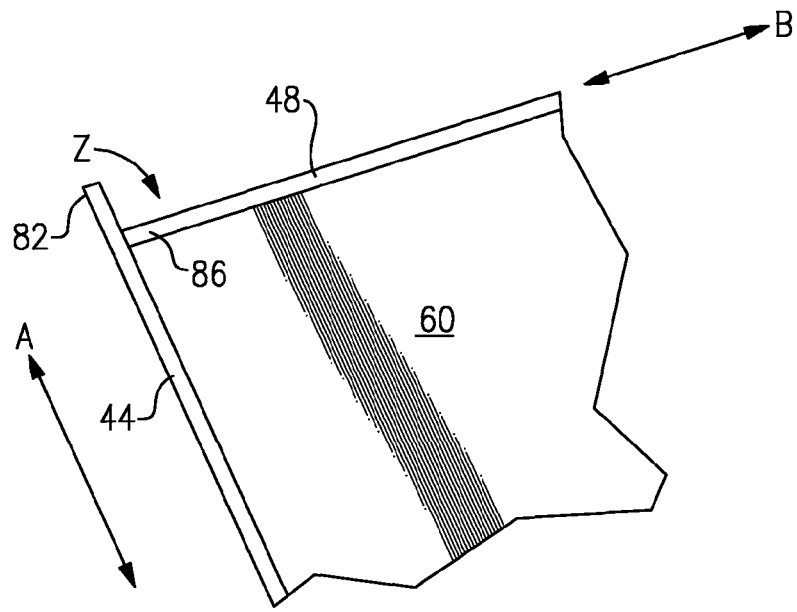
FIG. 6 illustrates the overlapping of each portion of FIG. 5.
Figure 7:
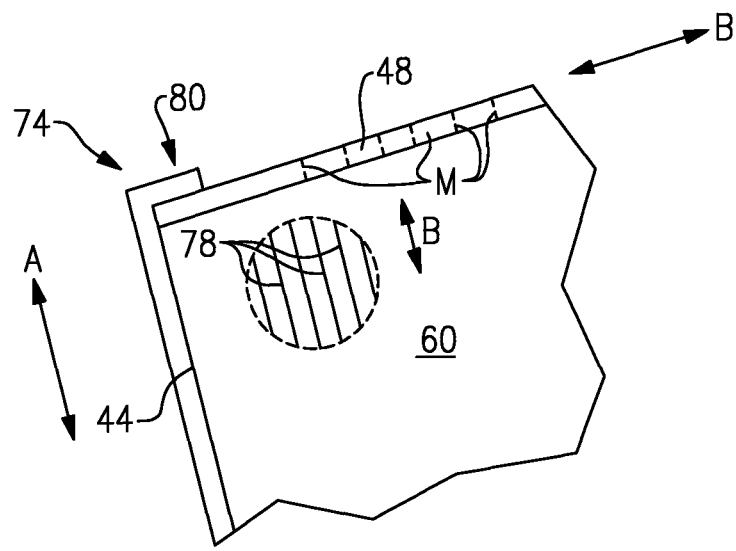
FIG. 7 illustrates the overlapped portions forming a corner.

With reference to FIG. 3 as shown, first axial flange 44 intersects first peripheral flange 48 at first corner 74. Because carbon composite duct assembly 24 is made of carbon composite fabric, there is a difficulty in creating this corner. FIGS. 4-13 illustrate how a corner is manufactured. With reference to FIG. 4, there is provided first carbon composite fabric layer 60, a portion of which will form first peripheral flange 48 while the other portion will form first axial flange 44. First carbon composite fabric layer 60 has first section 70. Along line K, first section 70 is cut creating first portion 82, a tab, and second portion 86, another tab. First portion 82 is now relatively moveable with respect to second portion 86. First portion 82 may rotate about axis A while second portion 86 may rotate about axis B, an axis perpendicular to axis A. Second portion 86 is rotated about axis B in the direction of arrow X to the position shown in FIG. 5. As shown in FIG. 5, first portion 82 may be rotated about axis A in the direction of arrow Y to the position shown in FIG. 6. Then, first portion 82 may then be turned in the direction of arrow Z into second portion 86 forming first overlap 80 as shown in FIG. 7. First portion 82 is adhered to second portion 86 with known adhesives thereby forming first corner 74. As can be seen, first corner 74 is made from first axial flange 44 and first peripheral flange 48. In addition, as shown, first carbon composite fabric layer 60 has first plurality of carbon strands 78, say for example, extending generally along axis A.

Figure 8:
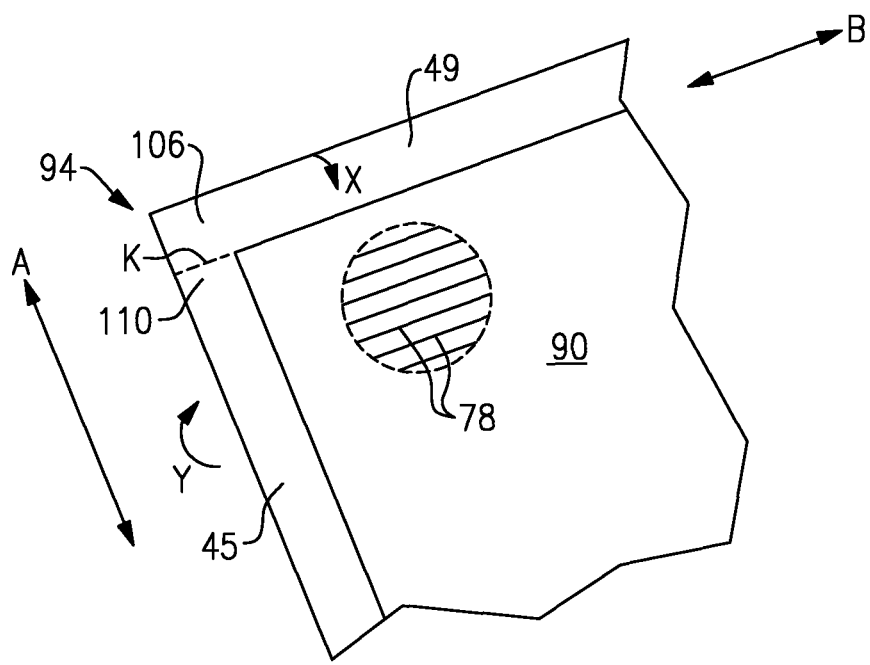
FIG. 8 illustrates a second carbon composite fabric layer.
Figure 9:
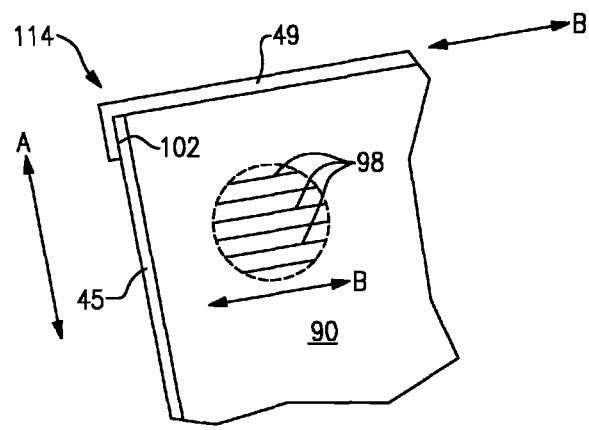
FIG. 9 illustrates a corner created in the second carbon composite fabric layer having a different overlap than the overlap of FIG. 7.

Following formation of first corner 74, other additional layers may be created. With reference to FIG. 8, there is provided second carbon composite fabric layer 90. Second carbon composite fabric layer 90 has first axial flange 45 and first peripheral flange 49. Ultimately, second carbon composite fabric layer 90 will overlap the first carbon composite fabric layer 60 so that first axial flange 44 overlaps with first axial flange 45 and first peripheral flange 48 will overlap with first peripheral flange 49 to form flanges of multiple carbon composite fabric layers. Referring back to FIG. 8, second section 94 of second carbon composite fabric layer 90 is cut along line L thereby creating third portion 106 and fourth portion 110. Similar to the construction of first corner 74, first axial flange 45 may be turned in the direction of arrow Y while first peripheral flange 49 can be turned in the direction of arrow X so that third portion 106 overlaps fourth portion 110 to form second corner 114 as shown in FIG. 9. As further shown in this figure, second carbon composite fabric layer 90 has a second plurality of carbon strands 98, say for example, generally extending along axis B.

Figure 10:
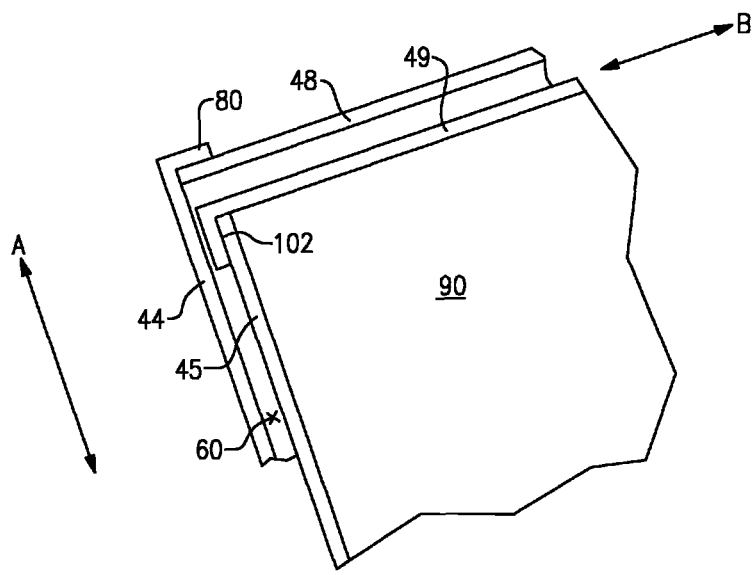
FIG. 10 illustrates the layering of the first carbon composite fabric layer onto the second carbon composite fabric layer.

As shown in FIG. 10, second carbon composite fabric layer 90 is layered over first carbon composite fabric layer 60 such that first plurality of carbon strand 78 of first carbon composite fabric layer 60 are transverse to second plurality of carbon strands 98. In this way, first plurality of carbon strands 78 lays across second plurality of carbon strands 98 to create a stronger duct body 36.

Figure 11:
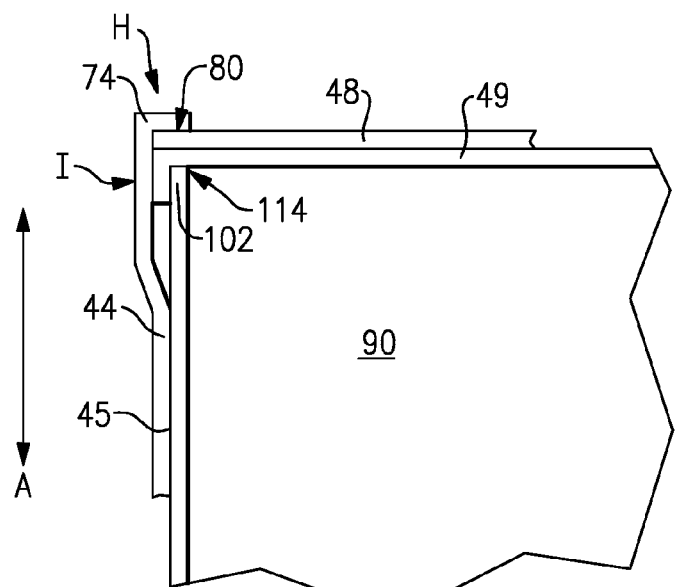
FIG. 11 illustrates the layered first carbon composite fabric layer and a second carbon composite fabric layer.

In addition, first overlap 80 extends along first axis B while second overlap 102 extends along second axis A. By layering second carbon composite fabric layer 90 onto first carbon composite fabric layer 60 in this way, first corner 74 may be layered onto second corner 114 so that first overlap 80 is displaced from second overlap 102 as shown in FIG. 11. By alternating overlaps in this way, the corner of duct body 36 is strengthened. Excess material may be machined off or otherwise removed at locations H and I so that duct body 36 conforms to specification. The layering of each carbon composite fabric layer can occur in the manner described above with alternating overlaps and having carbon strands of each layer intersect each other, thereby producing a resilient duct body 36.

To form duct body 36, the layering of carbon composite fabric layers, such as first carbon composite fabric layer 60 and second carbon composite fabric layer 90, occurs on male mold 120, which is shaped in a semi-cylindrical fashion in the desired shape of duct body 36. To permit first carbon composite fabric layer 60 to lay flat on semi-cylindrical male mold 120, first carbon composite fabric layer 60 is darted, cut, along first peripheral flange 48 along lines M thereby allowing first carbon composite fabric layer 60 to curl over male mold 120. Other layers are likewise darted along peripheral flanges. First carbon composite fabric layer 60 is layered onto male mold 120 followed by second carbon composite fabric layer 90 in the direction of arrow G.

Figure 12:
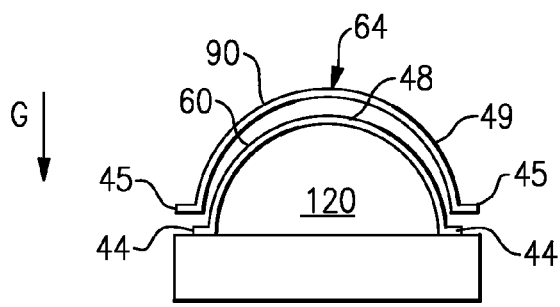
FIG. 12 illustrates a male mold for forming the first carbon composite fabric layer and a second carbon composite fabric layer into one half of the carbon composite duct assembly.
Figure 13:
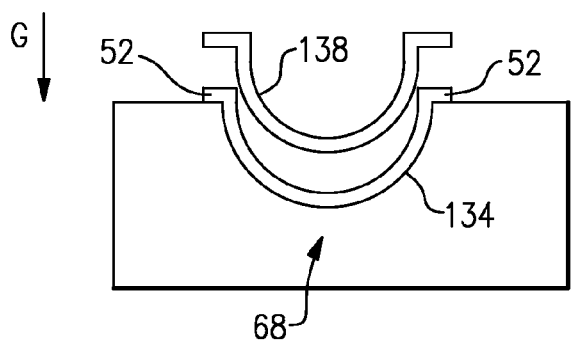
FIG. 13 illustrates a female mold for the formation of the other half of a carbon composite duct assembly.

With reference to FIG. 13, there is shown a female mold 130. Male mold 130 may be used to form second duct body portion 68 in the same manner as first duct body portion 64 as shown in FIG. 12. As shown, layers of carbon composite fabric, such as third carbon composite fabric layer 134 and fourth carbon composite fabric layer 138 are disposed into male mold 130.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

The invention claimed is:

1. A method of manufacturing a carbon composite turbine engine duct assembly, comprising:
   a) providing a first carbon composite fabric layer having a first section;
   b) forming the first section into a first portion and a second portion, the first portion separately movable relative to the second portion;
   c) overlapping the first portion onto the second portion to define a first corner of the first carbon composite fabric layer;
   d) forming the first carbon composite fabric layer into at least a first portion of a duct extending along an axis; and
   e) connecting the first portion to a second portion of the duct to form the carbon composite turbine engine duct assembly.

2. The method of claim 1, wherein the duct is a turbine engine duct body.

3. The method of claim 1, wherein the step of forming the first section includes cutting the first section along a line between the first portion and the second portion to create first and second tabs.

4. The method of claim 1, comprising rotating the second portion, then rotating the first portion, and then performing the step of overlapping.

5. The method of claim 1, wherein the first portion is adhered to the second portion using an adhesive to form the first corner.

6. The method of claim 1, wherein the first corner is made from a first axial flange and a first peripheral flange.

7. The method of claim 1, comprising layering a second carbon composite fabric layer onto the first carbon composite fabric layer within a mold.

8. The method of manufacturing of claim 1 wherein at least one of the first portion and the second portion form a flange of the duct.

9. The method of manufacturing of claim 8 wherein the flange extends along the axis.

10. The method of manufacturing of claim 8 wherein the flange extends transverse to the axis.

11. The method of manufacturing of claim 10 wherein the duct defines an opening, the flange extending transverse to the axis around the opening.

12. The method of manufacturing of claim 1 including the steps of:
- e) providing a second carbon composite fabric layer having a second section;
- forming the second section into a third portion and a fourth portion, the third portion separately movable relative to the fourth portion;
- g) overlapping the third portion onto the fourth portion to define a second corner of the second composite fabric layer; and
- h) layering the second carbon composite fabric layer onto the first carbon composite fabric layer so that the second corner overlaps the first corner.

13. The method of claim 12 wherein the first carbon composite fabric layer has a first plurality of carbon strands generally extending along a first carbon strand axis and the second carbon composite fabric layer has a second plurality of carbon strands generally extending along a second carbon strand axis wherein the second carbon composite fabric layer is layered onto the first carbon composite fabric layer so that the first carbon strand axis is transverse to the second carbon strand axis.

14. The method of claim 12 wherein the first portion and the second portion form a first overlap and the third portion and the fourth portion form a second overlap, wherein the second corner overlaps the first corner so that the first overlap is displaced from the second overlap.

15. The method of claim 14 including the step of:
- i) eliminating at least a portion of one of the first overlap and the second overlap.

16. The method of claim 14, wherein the first overlap extends along a first axis and the second overlap extends along a second axis that is transverse to the first axis.

17. The method of claim 14, comprising alternating overlaps between the first overlap and the second overlap.

18. A method of manufacturing a carbon composite turbine engine duct assembly, comprising:
- a) providing a first duct body with a first carbon composite fabric layer;
- b) extending a first axial flange from the first carbon composite fabric layer;
- c) extending a first peripheral flange from the first carbon composite fabric layer;
- d) overlapping the first axial flange onto the first peripheral flange to form a first corner of the first carbon composite fabric layer; and
- e) connecting the first duct body to a second duct body to from the carbon composite turbine engine duct assembly.

19. The method of claim 18 wherein the first axial flange extends from the duct body along an axis and the first peripheral flange radially extends from the duct body.

20. A method of manufacturing a carbon composite duct assembly, comprising:
- creating a first carbon composite fabric layer that includes a first corner made from a first axial flange and a first peripheral flange that intersects the first axial flange at the first corner;
- creating a second carbon composite fabric layer that includes a second corner made from a second axial flange and a second peripheral flange that intersects the second axial flange at the second corner;
- layering the first carbon composite fabric layer onto a mold;
- layering the second carbon composite fabric layer onto the first carbon composite fabric layer within the mold to form a first turbine engine duct body portion; and
- connecting the first turbine engine duct body portion to a second turbine engine duct body portion to form the carbon composite duct assembly, wherein each of the first turbine engine duct body portion and the second turbine engine duct body portion represents half of the carbon composite duct assembly.

* * * * *

UNITED STATES PATENT AND TRADEMARK OFFICE
CERTIFICATE OF CORRECTION

PATENT NO. : 8,973,263 B2  Page 1 of 1
APPLICATION NO. : 13/094037
DATED : March 10, 2015
INVENTOR(S) : Anthony Rivera It is certified that error appears in the above-identified patent and that said Letters Patent is hereby corrected as shown below:

IN THE CLAIMS:

In claim 12, column 5, line 5; before "forming" insert --f)--

Signed and Sealed this
Twenty-second Day of September, 2015

Michelle K. Lee
*Director of the United States Patent and Trademark Office*